United States Patent
Horiuchi (10) Patent No.: US 7,839,539 B2
(45) Date of Patent: Nov. 23, 2010

(54) METHOD, PRINTER DRIVER, AND SYSTEM FOR PRINTING A STAMP CORRELATED TO A SPECIFIED PRINT MODE

(75) Inventor: Yukiharu Horiuchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 695 days.

(21) Appl. No.: 11/856,864

(22) Filed: Sep. 18, 2007

(65) Prior Publication Data

US 2008/0079978 A1 Apr. 3, 2008

(30) Foreign Application Priority Data

Oct. 2, 2006 (JP) .............................. 2006-270459

(51) Int. Cl.
*H04N 1/387* (2006.01)
*H04N 1/50* (2006.01)
*B41J 2/01* (2006.01)

(52) U.S. Cl. ..................... 358/3.28; 358/1.13; 358/502; 347/3; 347/105; 347/107

(58) Field of Classification Search ................. 358/1.9, 358/3.28, 1.13, 1.18, 502, 526; 347/2, 3, 347/105–107; 283/71, 113, 114, 902; 235/494
See application file for complete search history.

(56) References Cited

U.S. PATENT DOCUMENTS 5,601,018 A * 2/1997 Iimura et al. .................... 399/1
6,454,380 B1 9/2002 Endo
6,478,400 B1 11/2002 Endo
6,809,841 B2 * 10/2004 Brewster ..................... 358/1.9
7,057,747 B1 * 6/2006 Minagawa .................. 358/1.13
7,188,774 B2 * 3/2007 Pinchen et al. .............. 235/494
7,292,356 B2 * 11/2007 Otokita ....................... 358/1.13
7,369,279 B2 * 5/2008 Van Oosterhout .......... 358/3.28
2003/0218656 A1 * 11/2003 Yamazaki et al. ............. 347/43
2010/0060941 A1 * 3/2010 Zhang ....................... 358/3.28

FOREIGN PATENT DOCUMENTS

| JP | 08018767 | 1/1996 |
|---|---|---|
| JP | 11192771 | 7/1999 |
| JP | 2000071547 | 3/2000 |
| JP | 2000190469 | 7/2000 |
| JP | 2003311939 | 11/2003 |
| JP | 2004195862 | 7/2004 |

* cited by examiner

*Primary Examiner*—Scott A Rogers
(74) *Attorney, Agent, or Firm*—Mark P. Watson (57) ABSTRACT

A printer driver enables printing a color loss determination stamp that accurately indicates whether color loss has occurred in every print mode available on a printer. The image data parameter and storage unit 42 of the printer driver 1 stores a plurality of color loss determination bitmap image data 20 units used for printing a color loss determination stamp 18 correlated to each print mode. When a print mode is selected, an image data selection unit 43 selects and prints the color loss determination bitmap image data 20 corresponding to the print mode. A color loss determination stamp 18 that accurately reflects if color loss has occurred can therefore be printed when printing in any print mode.

14 Claims, 7 Drawing Sheets

METHOD, PRINTER DRIVER, AND SYSTEM FOR PRINTING A STAMP CORRELATED TO A SPECIFIED PRINT MODE

CROSS-REFERENCE TO RELATED APPLICATIONS

Japanese Patent application No. 2006-270459 is hereby incorporated by reference in its entirety.

BACKGROUND

1. Field of Invention

The present invention relates to a printing method, a printer driver, and a system for printing a color loss determination stamp enabling easy verification of color loss (any printable color not printing) when printing in any print mode on a printer having a plurality of print modes.

2. Description of the Related Art

Stamps such as COPYING PROHIBITED, IMPORTANT, URGENT, and CONFIDENTIAL indicating how a document can be used are sometimes printed when print data created by a computer software application is printed using a connected printer. The printer driver provides the ability to print such stamps (see Japanese Patent No. 3419320).

Such stamps are printed by merging image data for the stamp with the print data created by the software application and printing the merged data (see Japanese Unexamined Patent Appl. Pub. JP-A-H08-18767).

One type of stamp also printed by inkjet printers is a color loss determination stamp, a stamp that enables the user to determine if the plural printable colors of ink are printing normally. An example of a color loss determination stamp printed by a four-color inkjet printer is described next.

The letters NG (referred to below as a "color loss determination unit") are printed in black ink in a prescribed printing area, and other printing areas (the background) are printed by overlaying three colors of ink, typically cyan, magenta, and yellow, producing a composite black. If all colors of ink, that is, black, cyan, magenta, and yellow in this example, print normally, the printed color of the color loss determination unit and the printed color of the background will be the same color (black). Thus, the entire printing area will be printed the same color, and the letters NG will be indistinguishable from the background.

However, if at least one color of ink does not print, that is, color loss occurs, the printed color of the color loss determination part and the printed color of the background will be different and the letters NG will be readable. Determining color loss is thus made possible.

The color loss determination stamp is a bitmap image for determining color loss. The bitmap image data for the color loss determination unit contains dots that are printed using black ink, and the bitmap image data for the background contains dots that are printed a composite black using the three colors cyan, magenta, and yellow. Both groups of dots are controlled so that they are printed in the same color (e.g. black or a shade of gray).

Printers and printer drivers have plural print modes optimized for the type of printing paper, the print resolution, and printing speed of the printer. The print modes can be selected by the printer driver. One print mode is selected from among the plural print modes for printing. Examples of the print modes provided in an inkjet printer include a plain paper print mode, a glossy paper print mode, and a matte paper print mode for use with different types of paper. Each of these print modes can also be set to an image quality priority mode or a printing speed priority mode.

The color loss determination stamp printed on an inkjet printer that has plural print modes is printed based on bitmap image data for color loss determination that is stored in the printer driver. While the printed color in the color loss determination part and the printed color in the background are adjusted to produce the same color in a particular print mode, if the same image data is printed in a different print mode, the color printed in the color loss determination part and the color printed in the background may not be the same. This is because the number of ink shots discharged to print each color differs according to the print mode.

For example, if the bitmap image data for one color loss determination stamp is intended for printing in the speed priority mode of the plain paper print mode, the printed color of the color loss determination part and the printed color of the background will match, and the entire color loss determination stamp will be printed the same black (or shade of gray) color. However, if the same print data is printed using the image quality priority mode of the glossy paper print mode, the dots printed in the background portion will not be the same black as the color loss determination area. The background portion may be a lighter gray or a color such as a shade of red or green. The letters NG will therefore be legible even though none of the colors are actually missing, and the user will mistakenly determine that color loss has occurred.

SUMMARY OF THE INVENTION

A method of printing a color loss determination stamp according to the present invention enables clearly confirmation of whether or not color loss has occurred in any print mode available with the printer or printer driver. The number of ink shots discharged for print each color is optimized.

A printer driver according to another aspect of the invention controls a printer and prints a color loss determination stamp according to the printing method of the invention.

A first aspect of the invention is a printing method for printing a stamp with a printer, the stamp including first image data composed of a specified color and second image data composed of a plurality of colors. The printing method has steps of: correlating the one or more stamps to a plurality of print modes that are available in the printer or a printer driver that controls the printer; selecting the stamp for a specified print mode; and printing the stamp in the specified print mode. There is a one-to-one correspondence between a stamp and a print mode. A first stamp, i.e. particular bitmap image data, may be correlated to one print mode. That same stamp, i.e. that same bitmap image data, may be correlated to second print mode. A different stamp, i.e. different bitmap image data may be correlated to third print mode, and so on.

This aspect of the invention prints the stamp corresponding to the print mode set in the printer or printer driver. The stamp includes first image data composed of a specified color and second image data composed of a plurality of colors, and is composed so that whether or not any of the print colors is missing can be determined in each print mode.

The first and second image data can be combined to form the stamp, and the stamp can be stored linked to the corresponding print mode. The image data used in each print mode can be dynamically generated when needed using a function, for example, but this requires additional processing time. By creating and combining the image data that forms the stamp and storing the stamp correlated to each print mode, a stamp for determining color loss can be printed immediately.

The invention also enables printing a different stamp in each print mode, or the same stamp for some print modes but a different stamp for other print modes. More specifically, the image data can be created with a one-to-one correspondence to each print mode.

When the printer prints print data received from an application, the invention also enables printing the stamp with the print data. This enables evaluating color loss that occurs when printing print data received from an application accurately and in real-time from the stamp that is printed simultaneously.

In this case the print mode can be specified by querying the operator to select at least one of the types of print medium, the resolution, or the printing speed. When the print mode is specified, the stamp corresponding to the specified print mode is selected, and the selected stamp is printed in the specified print mode.

The first image data in the stamp is printed using a first color, and the second image data is printed using a plurality of colors not including the first color.

When the stamp is printed in this way and there is no loss of color, the printed part containing the first image data and the printed part containing the second image data are the same color and are visually indiscernible. When any one of the colors is missing, the printed colors are different from each other and the printed first image data is visually distinguishable from the printed second image data.

The printer can be an inkjet printer.

Another aspect of the invention is a printer driver for printing a stamp with a printer, wherein the printer driver stores the stamp, and the stamp includes first image data composed of a specified color and second image data composed of a plurality of colors. The printer driver has an image data configuration and storage unit that correlates one or more stamps to a plurality of print modes that are available in the printer or the printer driver that controls the printer; an image data selection unit that selects the stamp for a specified print mode from the image data configuration and storage unit; a print data generation unit that generates print data containing the stamp; and a control unit that controls the printer to print the stamp in the specified print mode.

The printer driver according to this aspect of the invention can immediately print the stamp when printing print data received from an application. Furthermore, because the stamp corresponding to the print mode is selected and printed regardless of what print mode is set for the print data received from the application, when none of the colors used to print the stamp is lost, the printed color of the first image data and the printed color of the second image data in the stamp are printed to produce the same color and are visually indistinguishable in the resulting printout. The printed color of the first image data in the stamp and the printed color of the second image data will therefore not be rendered visually distinguishable due to differences in the print mode even though no color is actually missing, and the user will not erroneously determine that color loss has occurred. The complicated task of the user setting the stamp appropriately according to the specified print mode is also unnecessary.

In another aspect of the invention the printer driver specifies the print mode by selecting any one of the types of print medium, the resolution, and the printing speed. When the print mode is specified, the stamp corresponding to the specified print mode is selected, and the selected stamp is printed in the specified print mode.

The control unit of the printer driver prints the first image data in the stamp using a first color, and prints the second image data using a plurality of colors not including the first color. The print data generation unit of the printer driver generates the print data so that the first image data and the second image data are the same color and visually indiscernible when none of the colors used for printing is missing, and so that the printed colors are different and visually distinguishable when color loss occurs.

In this case, when none of the colors used to print is lost, the printed part containing the first image data and the printed part containing the second image data are the same visually indistinguishable color. When any one of the colors is missing, the printed colors are different, visually distinguishable colors.

Another aspect of the invention is a system for printing a stamp with a printer, the system having: a display device that displays an image data selection screen for selecting the stamp corresponding to a print mode; an input device for selecting the stamp; a computer that stores the print mode and the stamp correlated to the print mode; a printer driver that is installed in the computer, selects the stamp for a specified print mode from the computer and generates print data, and controls the printer to print in the specified print mode; and a printer that receives the print data from the computer and prints the stamp.

With this aspect of the invention the operator can easily configure the stamp using the input device because the display device displays an image data selection screen for setting the stamp. The stamp settings resulting from this operation can then be immediately stored in the computer to which the display device and input device are connected.

The printer driver can load print data for the stamp from the computer, add the stamp print data to the print data output from an application running on the computer, and print the merged data in the specified print mode on the printer.

The invention can use bitmap image data for determining color loss as the stamp data where the bitmap image data has a color loss determination part in which the first image data is printed and a background part that is printed as the second image data. Color loss can be easily evaluated using this color loss determination bitmap image data based on the result of the printed stamp. Print data received from an application and the image data for color loss determination can also be merged, and generating the merged print data is simple.

Effect of the Invention

The invention thus enables selecting image data for determining color loss according to the print mode set for the printer and the printer driver, and printing a stamp for determining color loss. By producing color loss determination image data for each print mode so that whether or not color loss has occurred is accurately reflected in each print mode, color loss can be accurately determined in each print mode.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Computer System

Figure 1:
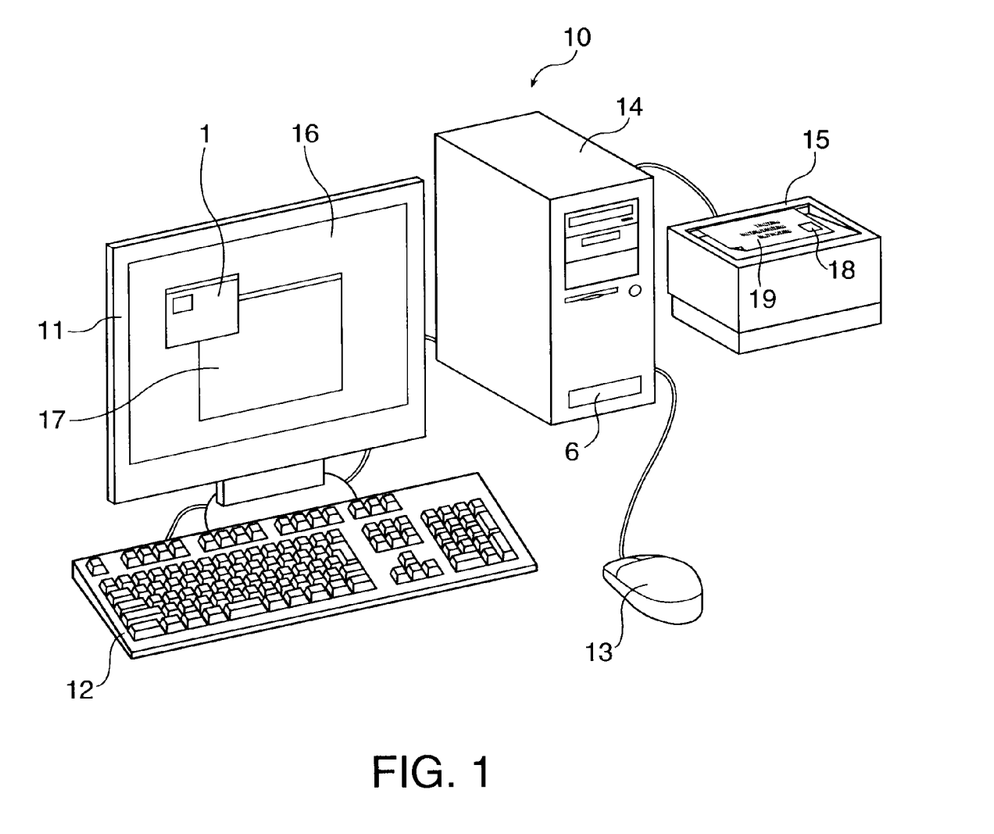
FIG. 1 is a schematic view of a computer system having a printer and a printer driver according to the present invention.

FIG. 1 shows the basic arrangement of a computer system 10 having a printer and a printer driver according to the present invention. This computer system 10 has a computer 14 to which a display 11, a keyboard 12, and a mouse 13 are connected as input and output devices, and a printer 15 that is also connected to the computer 14.

An operating system (OS) 16, an application 17 that runs under the OS 16, and a printer driver 1 that configures and drives the printer 15 are installed on the computer 14, and illustrated in FIG. 1 as running and displayed on display 11. The printer driver 1 receives print data output from the application 17 through the OS 16, and controls the printer 15 that prints the print data. The print modes can be built into the printer 15 or the printer driver 1. It is assumed below that the print modes are provided in the printer 15 and the printer driver 1 sets the print mode that is used for printing.

The printer 15 is an inkjet printer and is loaded with four colors of ink, black, cyan, magenta, and yellow. The printer 15 also has three print modes, a plain paper print mode, a glossy paper print mode, and a matte paper print mode, which are selected according to the type of printing paper. Each of these print modes can also be set to a "fine print mode" for printing with priority for print quality, and a "fast print mode" for printing with priority on printing speed. In combination, the printer therefore has six selectable print modes, also referenced below as first to sixth print modes.

The number of ink shots used to print a dot of a specific color and/or the resolution differs in each of the print modes. When printing on specialized printer paper such as the paper used in the glossy paper print mode, and when printing in the fine print mode, both the number of ink shots and the print resolution are high. When printing in the plain paper print mode and the fast print mode, fewer shots are discharged and the resolution is relatively low. The print data is printed according to the one print mode set by the printer driver 1 for a particular print job.

The printer driver 1 controls the printer 15 to print the print data received from the application 17. The printer driver 1 also has a function for printing a color loss determination stamp 18, which enables the user to easily determine if color loss has occurred, in a prescribed position on the printing paper 19.

Color Loss Determination Stamp and Bitmap Image Data for Determining Color Loss

The color loss determination stamp 18 is printed using color loss determination bitmap image data 20 that is stored in a storage device 6 (e.g. memory such as hard disk, RAM, CD, etc.) of the computer 14. The color loss determination bitmap image data 20 is stored in the storage device 6 of the computer 14 when the printer driver 1 is installed.

Figure 2:
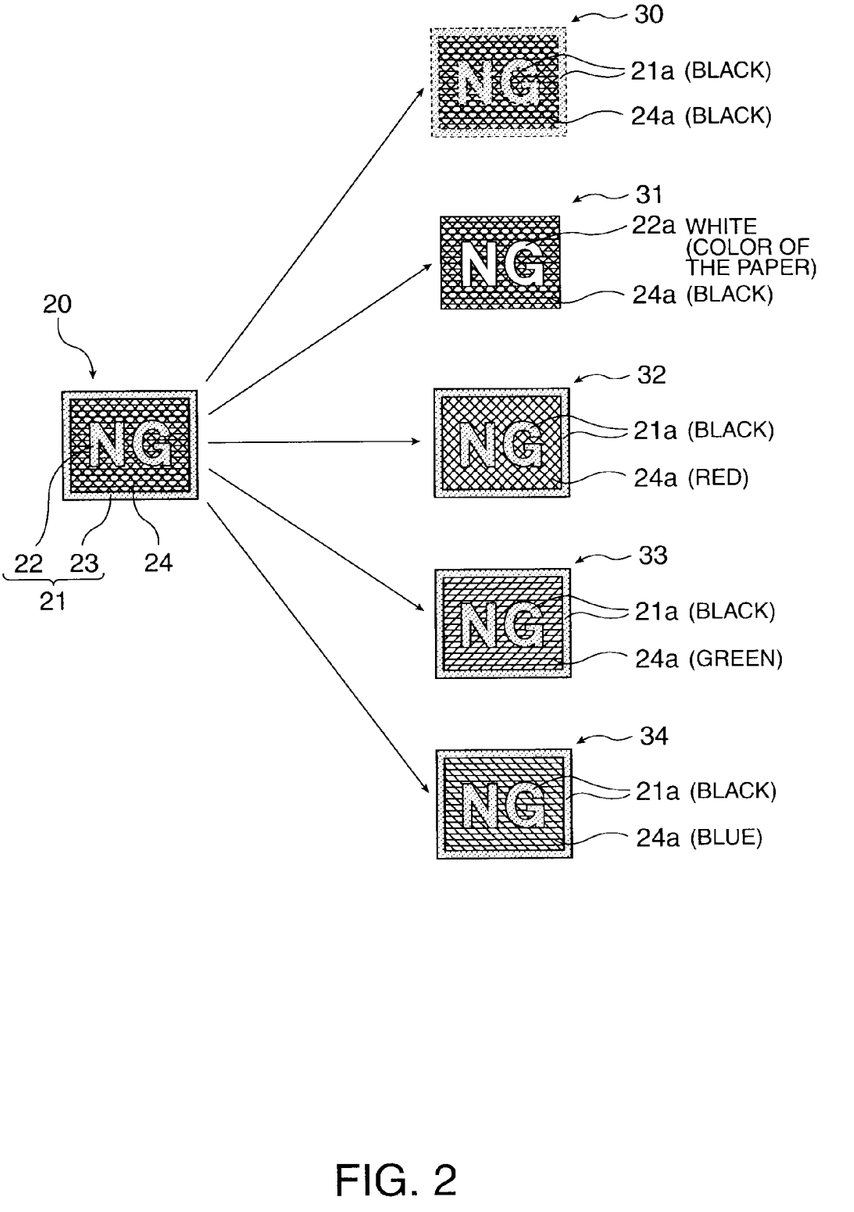
FIG. 2 shows a bitmap image data for determining color loss and various printed states.

As shown in FIG. 2, the color loss determination bitmap image data 20 has a color loss determination part 21 and a background part 24. The color loss determination part 21 is composed of dots that are printed using black ink that is installed in the printer 15. The background part 24 is composed of dots that are printed using cyan, magenta, and yellow inks. The color loss determination part 21 includes the letters NG 22 and a rectangular border 23 surrounding the letters NG 22. The background part 24 is the area inside the rectangular border 23 other than the letters NG 22. The dots rendering the color loss determination part 21 and the dots rendering the background part 24 are printed the same color (e.g. black or a shade of gray) when printed with no color loss. The color loss determination part 21 (first image data) and background part 24 (second image data) are combined to form the stamp, i.e. bitmap image data, which are stored in the storage device 6 of the computer. Each stamp is stored linked to a corresponding print mode as will be discussed in detail later.

In this aspect of the embodiment the background part 24 is composed of dots that are printed a composite black using the colors cyan, magenta, and yellow. In the printed state 30 of the color loss determination stamp 18 when there is no color loss, the printed color of the color loss determination unit 21a where the color loss determination part 21 is printed, and the printed color of the background unit 24a where the background part 24 is printed, are the same color, that is, black (or, for example, a shade of gray), and the entire stamp 18 is thus black. For the purpose of illustration, the different parts 21a and 24a are visually discernable in 30. But, in reality, 30 would appear as a solid black or solid gray box with all parts visually indiscernible form each other.

When the color loss determination stamp 18 is printed with at least one of the colors of ink missing, that is, when color loss has occurred, the printed colors of the color loss determination unit 21a and the background unit 24a will be different, the print unit 22a containing the letters NG 22 will become legible, and the user can easily know that color loss has occurred.

How the color loss determination stamp 18 is printed when one of the black, cyan, magenta, or yellow ink colors is lost is described next with reference to FIG. 2.

In the printed state 31 when black ink is lost the dots in the color loss determination part 21 do not print and only the dots in the background part 24 are printed black. The print unit 22a containing the letters NG 22 therefore remains the color of the printing paper, which is white in this example, and stands out from the black color of the background unit 24a.

In the printed state 32 when cyan is lost the dots in the background part 24 are printed red instead of black, and the dots in the color loss determination part 21 are printed black. The color loss determination unit 21a is thus black, the background unit 24a is red, and the print unit 22a containing the letters NG 22 are visually discernible. The dots in the background part 24 that should be printed black by combining cyan, magenta, and yellow are printed red, which is the mixture of magenta and yellow, because cyan is missing.

In the printed state 33 when magenta is lost the dots in the background part 24 are printed green instead of black, and the dots in the color loss determination part 21 are printed black. The color loss determination unit 21a is thus black, the background unit 24a is green, and the print unit 22a containing the letters NG 22 are visually discernible. The dots in the background part 24 that should be printed black by combining cyan, magenta, and yellow are printed green, which is the mixture of cyan and yellow, because magenta is missing.

In the printed state 34 when yellow is lost the dots in the background part 24 are printed blue instead of black, and the dots in the color loss determination part 21 are printed black. The color loss determination unit 21a is thus black, the background unit 24a is blue, and the print unit 22a containing the letters NG 22 are visually discernible. The dots in the background part 24 that should be printed black by combining cyan, magenta, and yellow are printed blue, which is the mixture of cyan and magenta, because yellow is missing.

The printer 15 has six print modes and the number of ink shots and/or the resolution are different in each print mode. If the dots in the background part 24 of the color loss determination bitmap image data 20 are defined as pixels that are printed by overlaying cyan, magenta, and yellow inks in the same ratio, the printed output will not be the desired black color (rendering the color loss determination stamp 18 a uniform black) in each print mode because of these differences in the shot count and/or resolution. One of the colors will therefore be more pronounced, and the background part 24 will be printed a color other than black. A color difference will therefore appear between the color loss determination unit 21a and the background unit 24a even though no color loss has occurred, and the print unit 22a containing the letters NG 22 will become legible.

Specific color loss determination bitmap image data 20 is therefore provided for each of the six print modes so that the dots in the background part 24 printed in each print mode are printed the desired black color (so that the entire color loss determination stamp 18 appears a uniform black color). The color loss determination bitmap image data 20 is then selectively used in each print mode to print the color loss determination stamp 18. More specifically, the color loss determination bitmap image data 20 prepared for each print mode differs in the ratio of cyan, magenta, and yellow that is used to print the dots in the background part 24.

Printer Driver

Figure 3:
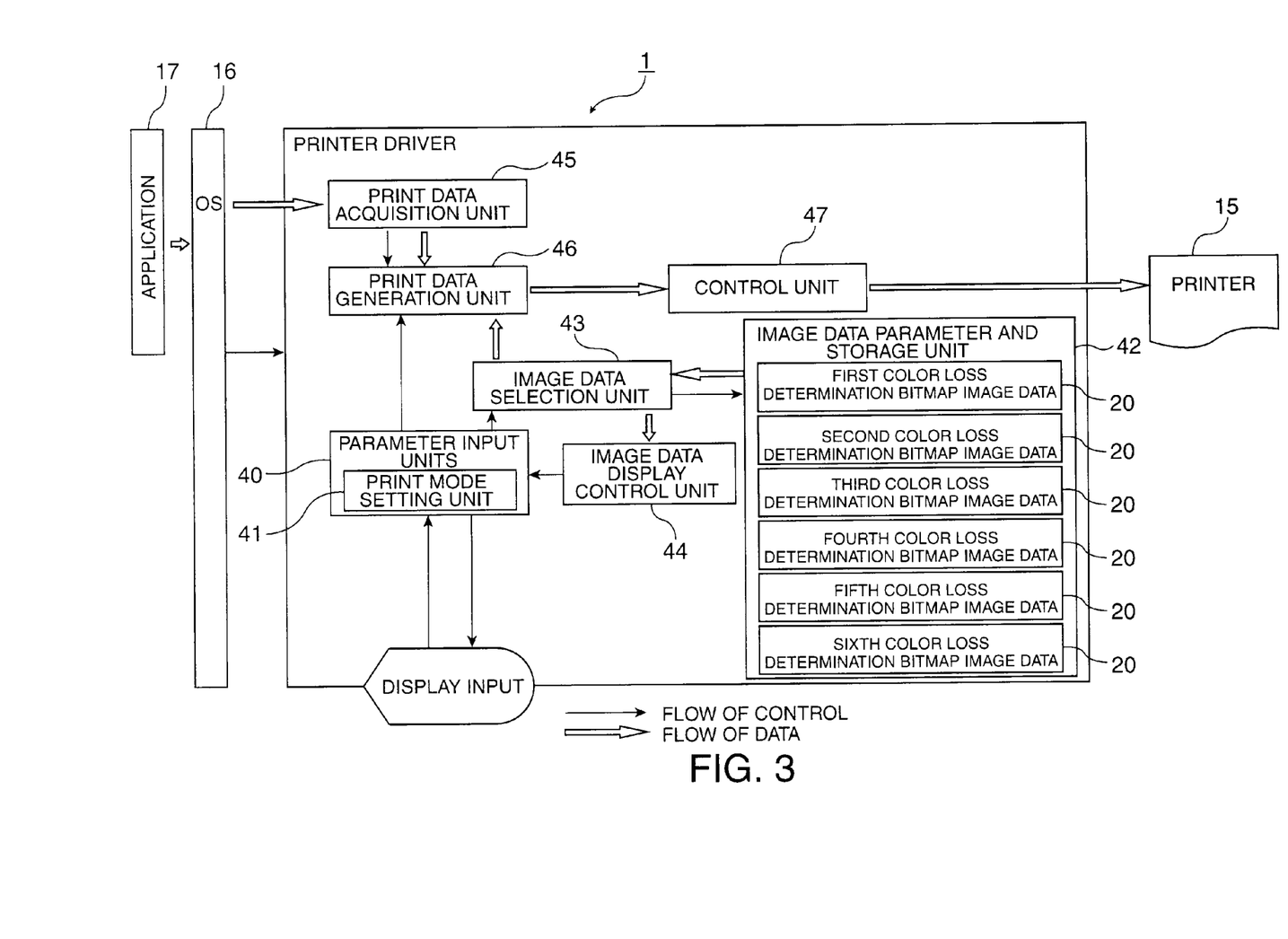
FIG. 3 is a block diagram of the printer driver according to the present invention.

FIG. 3 is a block diagram of the printer driver 1. The printer driver 1 drives the printer 15 to print the print data from the application 17 according to various settings. The printer driver 1 displays a dialog box on the display 11 so that the user can configure the various settings, and has various parameter input units 40 for setting the values input to input areas provided in the dialog box as the parameter settings of the printer 15.

The parameter input units 40 include a print mode setting unit 41.

The print mode setting unit 41 presents a print mode selection dialog box (print mode selection screen) for setting the print mode. More specifically, the user is queried to select the type of printing paper 19 and the resolution and/or the printing speed and print quality to configure the print mode that is then set as the selected print mode of the printer 15. The parameter input units 40 query the user to input such information as the size of printing paper 19, the type of the stamp to print, the position and on what pages the stamp is printed, and the bitmap image data used to print the stamp, and the input values are set as the printer 15 settings.

The printer driver 1 also includes an image data parameter and storage unit 42, an image data selection unit 43, and an image data display control unit 44.

The image data parameter and storage unit 42 stores the data for the six color loss determination bitmap images 20 that are used to print the color loss determination stamp 18 in each print mode correlated to each print mode.

The image data selection unit 43 detects the selected print mode, and selects the color loss determination bitmap image data 20 for the detected print mode from the image data parameter and storage unit 42.

The image data display control unit 44 displays the selected color loss determination bitmap image data 20 in the stamp image display frame 51 of the stamp configuration dialog box 50 (FIG. 4) that is displayed on the display 11 by the parameter input units 40.

The image data parameter and storage unit 42 stores the color loss determination bitmap image data 20 for the first to sixth print modes using the file names specified by the user using a stamp file selection dialog box 61 (FIG. 5) that is further described below.

The printer driver 1 also has a print data acquisition unit 45, a print data generation unit 46, and a control unit 47.

The print data acquisition unit 45 gets the print data output from the application 17 through the OS 16.

The print data generation unit 46 merges the color loss determination bitmap image data acquired by the image data selection unit 43 with the print data acquired by the print data acquisition unit 45 to generate the merged print data, which is the final print data that is printed by the printer 15.

The control unit 47 controls the printer 15 to print the merged print data.

Figure 4:
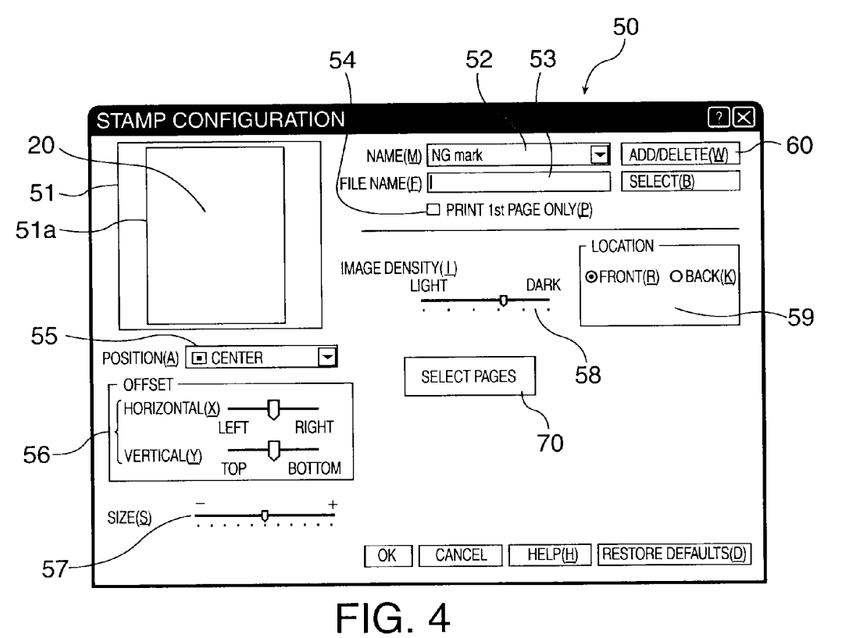
FIG. 4 shows a stamp configuration dialog box.

FIG. 4 shows an example of the stamp configuration dialog box 50 that is displayed on the display 11 by the parameter input units 40 for configuring the stamp.

The stamp configuration dialog box 50 has a stamp image display frame 51 in the upper left area for displaying a preview of the printed stamp. To the right of the stamp image display frame 51 are a stamp name input box 52 for entering the name of the color loss determination stamp 18 to be printed, a file name input box 53 for entering the file name of the bitmap image used to print the stamp, and a print page selection checkbox 54 for specifying on what pages the stamp is printed.

The stamp name input box 52 enables selecting the name of the stamp to be printed using the mouse 13, for example, from among a plurality of names presented in a pulldown menu. The stamp named "NG mark" is selected as the name of the stamp in the example shown in FIG. 4. The pulldown menu in this example also contains the names of stamps for printing COPYING PROHIBITED, IMPORTANT, URGENT, and CONFIDENTIAL, for example, and a "file name" item for specifying a different file name.

When the "file name" item is selected in the stamp name input box 52, the file name of the bitmap image data is entered in the file name input box 53. Pressing the SELECT button to the right of the file name input box 53 enables selecting the file name. The print page selection checkbox 54 specifies the pages on which the stamp is printed. Selecting the print page selection checkbox 54 in this aspect of this embodiment causes the stamp to be printed on only the first (cover) page that is printed by the application 17. In the default state with the print page selection checkbox 54 not selected, the stamp is printed on all printed pages.

Figure 5:
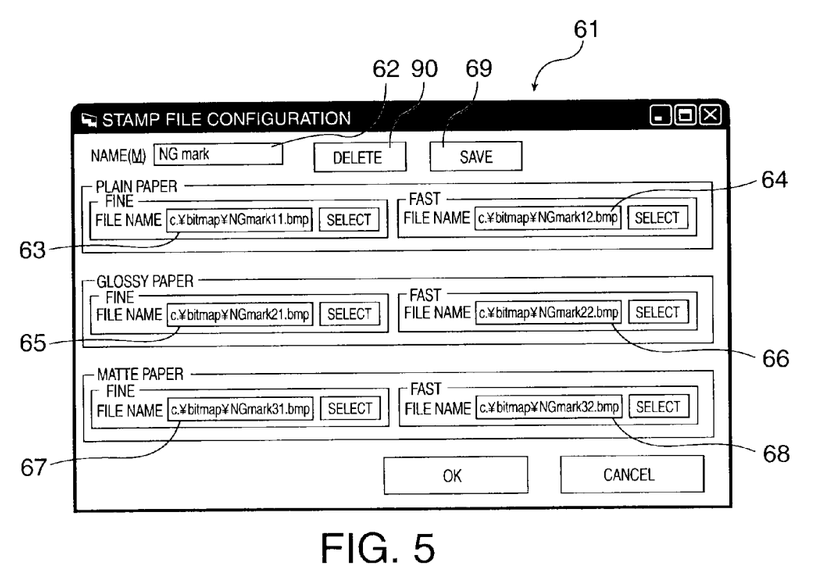
FIG. 5 shows a stamp file selection dialog box.

The color loss determination stamp 18 is printed using the color loss determination bitmap image data 20 defined for each print mode, and must therefore be stored correlated to the color loss determination bitmap image data 20 that is used for each print mode. This is done by clicking the ADD/DELETE button 60 to the right of the stamp name input box 52 to open the stamp file selection dialog box 61.

As shown in FIG. 5 the stamp file selection dialog box 61 in this embodiment of the invention has a stamp name input box 62 in which the name of the stamp selected for printing is entered, and file name input boxes 63 to 68 for entering the file name of the color loss determination bitmap image data 20 file that is used in each of the six print modes.

In this example the file name "NGmark11.bmp" is entered in the file name input box 63 as the name of the color loss determination bitmap image data 20 file that is used in the fine print mode of the plain paper print mode, that is, the first print mode. The SELECT button on the right side of the file name input box 63 can be clicked to select the file name from a list of files.

The file name "NGmark12.bmp" is entered in the file name input box 64 as the name of the color loss determination bitmap image data 20 file that is used in the fast print mode of the plain paper print mode, that is, the second print mode.

Similarly, the file name "NGmark21.bmp" is entered in the file name input box 65 for the fine print mode of the glossy paper print mode, that is, the third print mode, and "NGmark22.bmp" is entered in the file name input box 66 for the fast print mode of the glossy paper print mode, that is, the fourth print mode.

The file name "NGmark31.bmp" is entered in the file name input box 67 for the fine print mode of the matte paper print mode, that is, the fifth print mode, and "NGmark32.bmp" is entered in the file name input box 68 for the fast print mode of the matte paper print mode, that is, the sixth print mode.

Clicking the SAVE button 69 saves the entered file names as the color loss determination bitmap images 20 correlated to the print modes in the image data parameter and storage unit 42. When the stamp file selection dialog box 61 is next opened, the file names stored correlated to the print modes are displayed in the corresponding file name input boxes 63 to 68.

The settings stored in the image data parameter and storage unit 42 can be deleted by pressing the DELETE button 90.

When the color loss determination bitmap image data 20 is stored correlated to a print mode by the image data parameter and storage unit 42, the image data selection unit 43 can detect the set print mode and select and read from the image data parameter and storage unit 42 the color loss determination bitmap image data 20 defined for the detected print mode.

When the print mode setting is changed by the print mode setting unit 41, the image data selection unit 43 changes the selected color loss determination bitmap image data 20 accordingly. If the print mode is set at the printer 15 and not the printer driver 1, the printer driver 1 detects the print mode set in the printer 15 when the print data is received from the application 17 and then retrieves the corresponding color loss determination bitmap image data 20.

Returning to FIG. 4, the stamp configuration dialog box 50 is described below. A rectangle 51a representing the selected printing paper 19 is displayed inside the stamp image display frame 51 based on the size of the printing paper 19 set in the parameter input units 40. The color loss determination bitmap image data 20 acquired by the image data selection unit 43 is displayed by the image data display control unit 44 inside this rectangle 51a.

Below the stamp image display frame 51 are a printing position input box 55 for setting the general position where the stamp is printed, slide bars 56 for adjusting the printing position, and a slide bar 57 for setting the size.

On the right side of the stamp image display frame 51 is a slide bar 58 for setting the print density of the stamp, and a selection button 59 for selecting whether to print the stamp on the front or the back of the printing paper 19. The printing position is selected from a pulldown menu for entry in the printing position input box 55. Typical choices in the pulldown menu include top left, top center, top right, center, bottom left, bottom center, and bottom right.

If the operator changes the value entered in the printing position input box 55, or adjusts the setting by moving any of the slide bars 56, 57, or 58, the image data display control unit 44 adjusts the position, size, and density of the color loss determination bitmap image data 20 displayed inside the rectangle 51a accordingly. The operator can therefore see what the color loss determination stamp 18 will look like when it is printed.

In this embodiment of the invention the image data display control unit 44 uses the color loss determination bitmap image data 20 selected by the image data selection unit 43 when displaying a print preview in the stamp image display frame 51. Alternatively, color loss determination bitmap image data for displaying on screen can be additionally prepared and used for the display when, for example, the stamp name "NG mark" indicating the color loss determination stamp 18 is entered in the stamp name input box 52.

Figure 6:
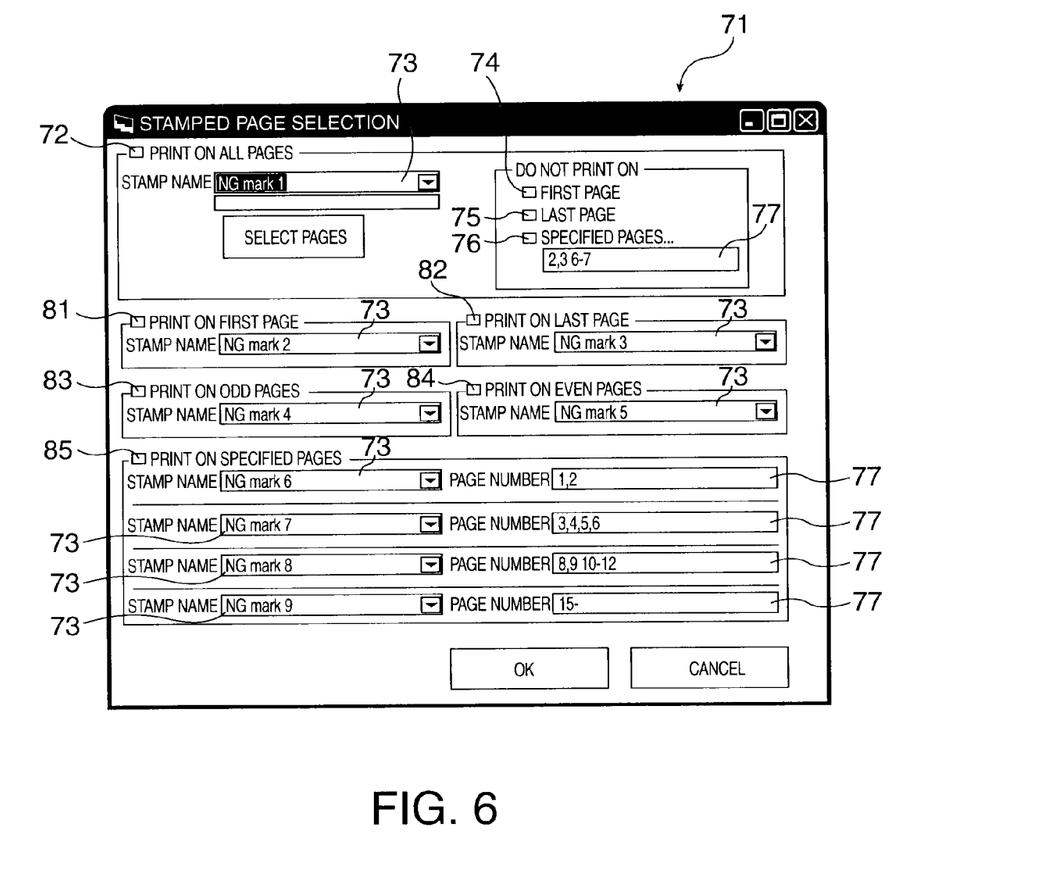
FIG. 6 shows a stamped page selection dialog box.

A SELECT PAGES button 70 for specifying the pages on which the stamp is printed is also provided in the middle of the stamp configuration dialog box 50. Clicking this SELECT PAGES button 70 opens a stamped page selection dialog box 71 such as shown in FIG. 6. The stamp configuration dialog box 50 shown in FIG. 4 only enables selecting whether the same stamp is printed on all pages or only on the first page by checking the print page selection checkbox 54. The stamped page selection dialog box 71, however, enables selecting the type of stamp that is printed and whether a stamp is printed or not on each page of the printing paper 19 that is printed by the print data output from the application 17.

A checkbox 72 for selecting printing a stamp on every page is provided at the top left part of the stamped page selection dialog box 71. This checkbox 72 is selected by default. Below this checkbox 72 is a stamp name input box 73 for entering the name of the stamp to be used. What stamp is printed can be changed by entering the name in this stamp name input box 73. The stamp name entered in the stamp name input box 52 in the stamp configuration dialog box 50 is initially set in this stamp name input box 73 by default.

To the right of the stamp name input box 73 are three checkboxes 74, 75 and 76 for setting the pages on which the stamp is not printed. These three checkboxes 74, 75 and 76 are only enabled and selectable when the checkbox 72 for printing the stamp on all pages is selected (checked).

When the top checkbox 74 of the three checkboxes is selected, the first page is removed from the pages on which the stamp is printed. When the middle checkbox 75 is selected, the last page is removed from the pages on which the stamp is printed. When the bottom checkbox 76 is selected, the pages specified in the page number input box 77 below the checkbox 76 are removed from the pages on which the stamp is printed.

By entering a comma delimited list of page numbers in the page number input box 77, multiple page numbers can be specified for not printing the stamp. By entering page numbers separated by a hyphen, a range of pages from the first page number to the second page number can be specified for not printing the stamp. By entering a page number followed by a hyphen on the right, all pages from the specified page number to the end of the document can be specified for not printing the stamp.

More than one of the three checkboxes 74, 75 and 76 can also be checked at the same time so that the operator can easily and flexibly specify the pages on which the stamp is not printed.

Five checkboxes 81 to 85 for specifying the pages on which a stamp is printed are provided below the checkboxes 72, 74, 75 and 76.

Checking the first checkbox 81 selects printing a stamp on the first page.

Checking the second checkbox 82 selects printing a stamp on the last page.

Checking the third checkbox 83 selects printing a stamp on even-numbered pages.

Checking the fourth checkbox 84 selects printing a stamp on odd-numbered pages.

Checking the fifth checkbox 85 selects printing a stamp on specified pages. The pages on which a selected stamp are printed are specified by entering the page numbers in the corresponding page number input box 77.

A stamp name input box 73 for entering the name of the stamp to be printed is provided for each of the checkboxes 81 to 85. If the name entered in the stamp name input box 73 is different from the stamp name entered in the stamp name input box 52 in the stamp configuration dialog box 50, the stamp identified by the name in the stamp name input box 73 is printed on the pages specified by the corresponding checkboxes 81 to 85 instead. By configuring these settings, different stamps can be printed on different pages when printing the print data output from the application 17.

If the user settings set plural stamps for printing on the same page, the stamp specified in the stamp name input box 73 for the fifth checkbox 85 is preferentially printed. The stamps specified in the stamp name input boxes 73 for the fourth, third, second, and first checkboxes are then printed in descending order of priority.

Printing a Sample Color Loss Determination Stamp

An example of printing a color loss determination stamp 18 in conjunction with printing print data output from the application 17 is described next with reference to FIG. 7 and FIG. 8.

This application 17 is a product management application. When products are distributed to and stored in four different warehouses A, B, C, and D, the application 17 outputs a distribution manager label 91 and an inventory management label 92. The distribution manager labels 91 are printed with the names of the four distribution managers that are responsible for distributing the products to the different warehouses. The inventory management label 92 is applied to the outside of the cardboard box containing the products. One print job executed with the output print data prints four distribution manager labels 91 containing the four distribution managers for warehouses A to D on pages 1 to 4. The inventory management labels 92 containing the management information for managing the products are printed from page 5. The number of inventory management labels 92 increases or decreases according to the product type and the number of packages stored in the warehouse at one time. The surface of the label paper 19 used for printing is white.

The print data printed on the distribution manager label 91 includes the shipping date, the name of the warehouse where the product is stored, the name of the distribution manager, and the warehouse address.

The information contained in the print data printed on the inventory management label 92 includes the name of the packaged product, the product count, expiration date of the product stored in the warehouse, the inventory manager in charge of the product, the name of the warehouse where the product is stored, and a barcode identifying the same information. Information about the management color printed in the edge portions 95 at the top and bottom of the printing paper 19 is also included. These management colors are colors assigned to the warehouse name so that the name of the warehouse where the product is to be stored can be easily identified, and in this example red is assigned to warehouse A, blue is assigned to warehouse B, yellow to warehouse C and green to warehouse D.

In this example the operator has previously set the print mode of the printer 15 to the second print mode, that is, the fast print mode of the plain paper print mode, using a print mode selection dialog box (not shown). The image data selection unit 43 has also detected the print mode and retrieved the bitmap image data for the file name "NGmark12.bmp" that was set using the stamp file selection dialog box 61 as the color loss determination bitmap image data 20 to be used in this print mode.

The operator has also entered "bottom right" in the printing position input box 55 of the stamp configuration dialog box 50, and the printing position of the color loss determination stamp 18 is therefore set to the bottom right part of the page based on this value. In the stamped page selection dialog box 71 the operator has also checked the checkbox 72 to print the stamp on all pages, has checked the checkbox 76 to remove the specified pages from the pages on which the stamp is printed, and has entered the value "1-4" specifying the removed pages in the page number input box 77. The color loss determination stamp 18 is therefore not printed on pages 1 to 4 (the distribution manager label 91), and is printed starting from page 5 (the inventory management label 92).

When the printer driver 1 receives the print data for printing the distribution manager labels 91 and inventory management labels 92 from the application 17 with these settings, the print data generation unit 46 merges the received print data with the color loss determination bitmap image data 20 for the file named "NGmark12.bmp" retrieved by the image data selection unit 43, and generates the merged print data. More specifically, the print data generation unit 46 counts the pages to be printed using the print data, and merges the print data with the color loss determination bitmap image data 20 so that the color loss determination stamp 18 is printed at the bottom right part of the printing paper 19 using the print data for pages 5 and after. When the merged print data is generated, the control unit 47 controls the printer 15 and prints the merged print data.

Figure 7:
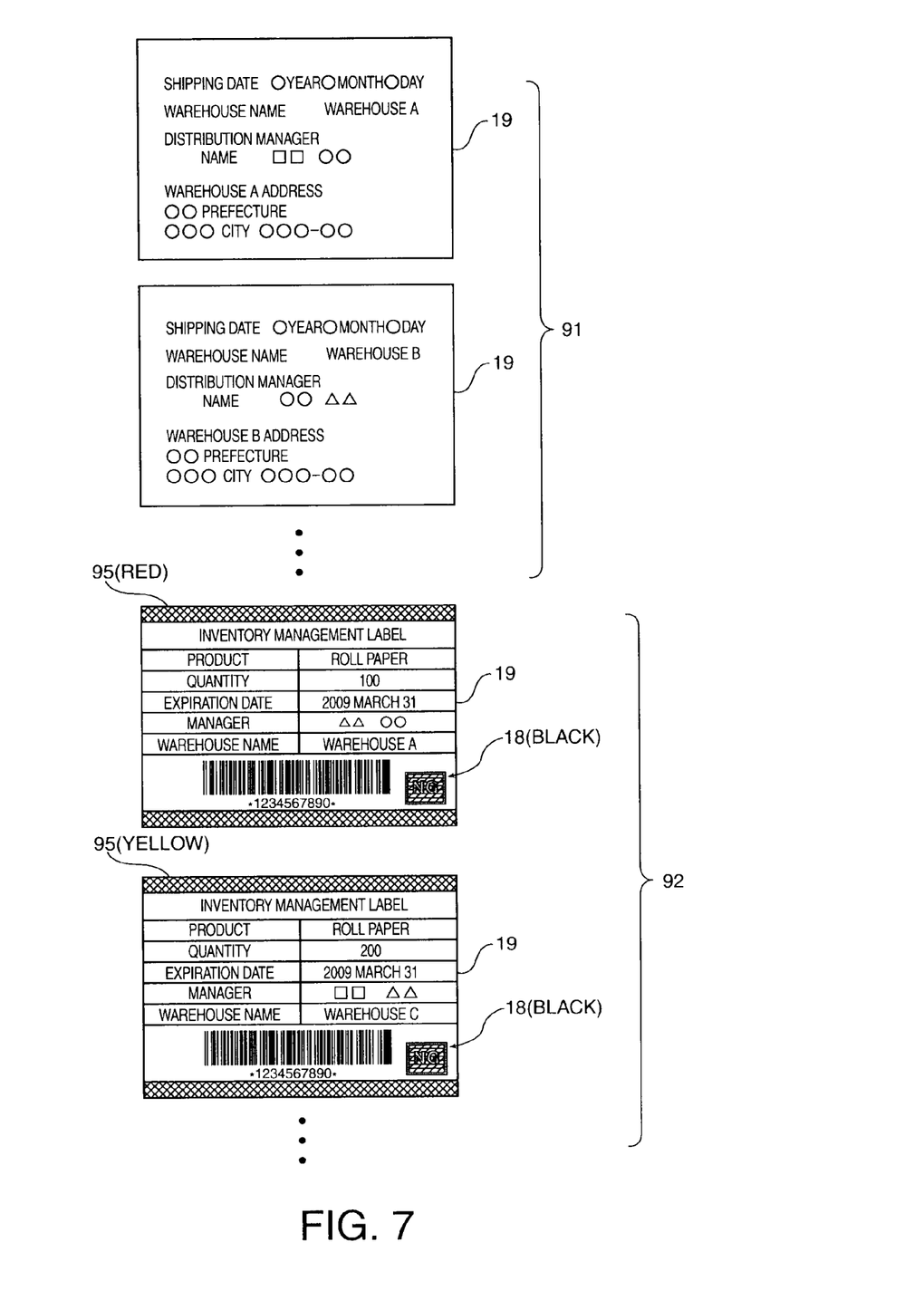
FIG. 7 shows print samples of a color loss determination stamp printed with print data from a software application.

FIG. 7 shows an example of the printout in this example. The distribution date, name of the distribution manager, name of the storage warehouse, and the warehouse address are printed in the distribution manager labels 91 printed on page 1 to page 4.

The name of the packaged product, the number packaged, expiration date of the product stored in the warehouse, the inventory manager in charge of the product, the name of the warehouse where the product is stored, and a barcode are printed in black ink in the middle of the printing paper 19 in the inventory management labels 92 printed from page 5. The management color assigned to the name of the warehouse where the produce is stored is printed in the top and bottom edge portions 95 of the printing paper 19 in the inventory management labels 92. More specifically, a red bar denoting warehouse A is printed in the top and bottom edge portions 95 on page 5, and a yellow bar denoting warehouse C is printed in the top and bottom edge portions 95 on page 6. The rectangular color loss determination stamp 18 is also printed at the bottom right part of the printing paper 19 in each of the inventory management labels 92.

Because the color loss determination stamp 18 is printed using the color loss determination bitmap image data 20 assigned to the second print mode in this example, the color loss determination unit 21a and the background unit 24a are printed the same color, that is, black, and the entire color loss determination stamp 18 is black when there is no color loss as shown in the print sample in FIG. 7. As a result, the print unit 22a containing the letters NG 22 cannot be read.

Figure 8:
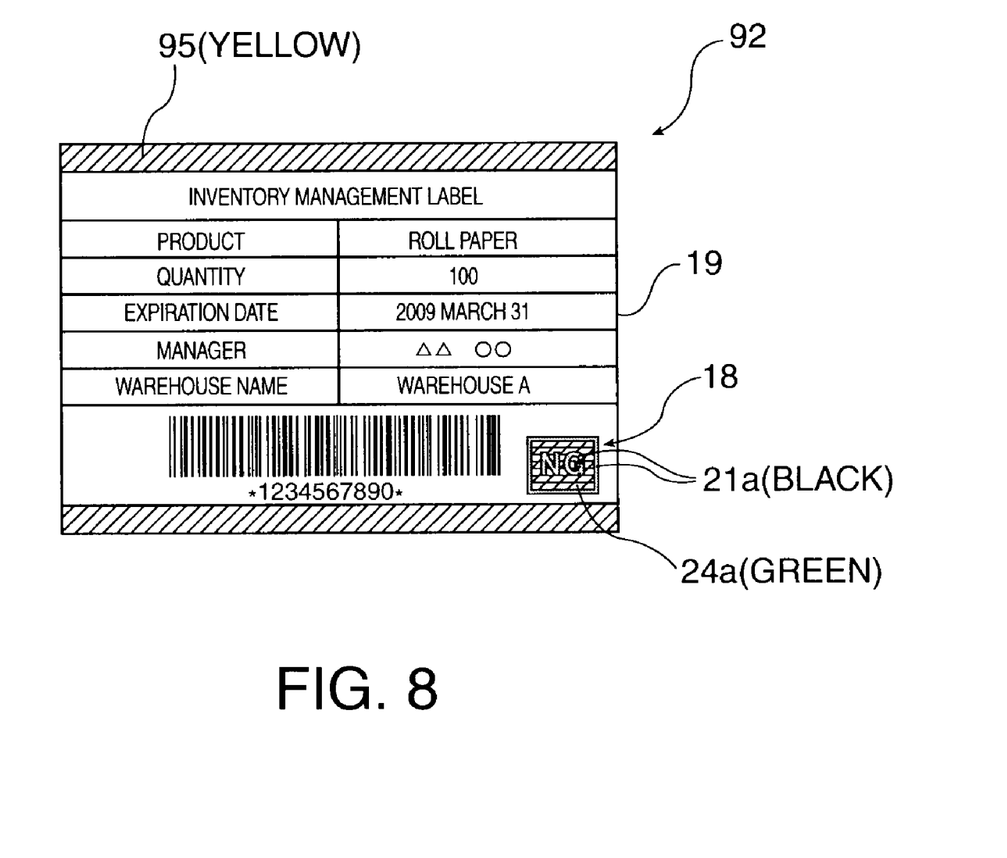
FIG. 8 shows an example of printing the print sample in FIG. 7 when a color is lost.

An example of the inventory management label 92 printed on page 5 when magenta ink does not print is shown in FIG. 8. The top and bottom edge portions 95 of the printing paper 19 where the management color is printed is therefore printed yellow instead of the red management color denoting warehouse A. Because the red color that should be printed is a combination of magenta and yellow inks, the loss of magenta means that only yellow ink is printed and the bars are therefore yellow.

The print unit 22a of the letters NG 22 that are printed using black ink in the color loss determination stamp 18 therefore become legible. More specifically, the printed color of the color loss determination unit 21a is black but the loss of magenta means that the printed color of the background unit 24a becomes green instead of black, and the print unit 22a containing the letters NG 22 becomes visible.

When the distribution manager sees the inventory management label 92 printed with this color loss determination stamp 18, the manager readily knows that the label was printed without the correct colors of ink. The distribution manager is therefore not misled by the yellow bars (warehouse C) printed in the top and bottom edge portions 95 of the printing paper 19, and can correctly direct the package to warehouse A because warehouse A is recorded as the storage location in the middle of the printing paper 19.

Other Embodiments

The foregoing embodiment of the invention prints the color loss determination stamp 18 with the print data when printing print data received from an application 17, but the color loss determination stamp 18 can be printed alone. This is helpful because color loss can then be determined when the system initializes, such as when the computer system 10 is turned on.

The image data parameter and storage unit 42 in the foregoing embodiment stores different color loss determination bitmap image data 20 for each print mode. However, if the color loss determination bitmap image data 20 results in the printed color loss determination unit 21a and background unit 24a being printed the same color even when printed in some different print modes, the color loss determination bitmap image data can be stored for use with the different print modes.

Furthermore, the dots in the color loss determination part 21 of the color loss determination bitmap image data 20 are printed using black ink, and the dots in the background part 24 are printed using the three ink colors cyan, magenta, and yellow in the foregoing embodiment. This arrangement can be reversed, however. That is, the dots in the color loss determination part 21 can be dots that are printed using the three ink colors cyan, magenta, and yellow, and the dots that are printed in the background part 24 can be dots that are printed using black ink. The color loss determination bitmap image data can also be stored separately for each print mode in this case.

Furthermore, the printed color of the color loss determination unit 21a and background unit 24a in the color loss determination stamp 18 when printed with no color loss is not limited to black, and could be gray by adjusting the dot density.

Yet further, the colors of ink used to print the dots in the color loss determination part 21 and the dots in the background part 24 are also not limited to the four colors black, cyan, magenta, and yellow.

For example, the color loss determination stamp 18 could be printed using the four colors black, light cyan, light magenta and yellow. In this case the dots in the color loss determination part 21 are dots that are printed using black ink, and the dots in the background part 24 are dots that are printed using light cyan, light magenta, and yellow. The printed color of the color loss determination unit 21a and the background unit 24a of the color loss determination stamp 18 printed when there is no color loss can be rendered black or gray in this case, too.

Furthermore, if a printed color using a single color of ink and a combination of plural colors of ink different from the single color of ink can be printed to render the same printed color, the color loss determination part 21 and the background part 24 can be rendered using this single color of ink and this combination of plural colors of ink.

Furthermore, an inkjet printer is used by way of example as the printer 15 in the foregoing embodiments, but the invention can also be applied to printers 15 using other printing methods. The invention can also be used with laser printers and thermal printers, for example.

Furthermore, the letters "NG" 22 are used in the color loss determination part 21 in the embodiments described above, but any symbol or graphic element that enables determining at a glance if printing was completed correctly can be used.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing method for printing a stamp with a printer, comprising:
   correlating one or more stamps to a plurality of print modes, with a one-to-one correlation between a stamp and a print mode, the plurality of print modes being available in the printer or in a printer driver that controls the printer;
   selecting a stamp for a specified print mode; and
   printing the selected stamp in the specified print mode.

2. The stamp printing method described in claim 1, wherein:
   each of the one or more stamps includes first image data composed of a specified color and second image data composed of a plurality of colors.

3. The stamp printing method described in claim 2, further comprising:
   combining the first and second image data to form a particular stamp; and
   storing the particular stamp linked to the correlated print mode.

4. The stamp printing method described in claim 1, further comprising:
   printing the selected stamp with print data when the printer prints other print data.

5. The stamp printing method described in claim 1, further comprising:
   specifying the print mode by selecting the type of print medium and/or printing speed.

6. The stamp printing method described in claim 2, wherein:
   the first image data is printed using a first color; and
   the second image data is printed using a plurality of colors not including the first color.

7. The stamp printing method described in claim 6, wherein:
   when none of the colors used to print the first and second image data is lost, the printed color of the first image data and the printed color of the second image data are combined to produce a single color so that the printed first image data is visually indiscernible from the printed second image data; and when any one of the colors used to print the first and second image data is lost, the printed color of the first image data and the printed color of the second image data are combined to produce different colors that are visually discernible.

8. The stamp printing method described in claim 6, wherein:

the printer is an inkjet printer.

9. A printer driver for printing a stamp with a printer, comprising:

an image data configuration and storage unit that correlates one or more stamps to a plurality of print modes, with a one-to-one correlation between a stamp and a print mode, the plurality of print modes being available in the printer or in a printer driver that controls the printer;

an image data selection unit that selects a stamp for a specified print mode from the image data configuration and storage unit;

a print data generation unit that generates print data containing the selected stamp; and a control unit that controls the printer to print the selected stamp in the specified print mode.

10. The printer driver described in claim 9, wherein:

each of the one or more stamps includes first image data composed of a specified color and second image data composed of a plurality of colors.

11. The printer driver described in claim 9, wherein the print mode is specified by selecting the type of print medium and/or printing speed.

12. The printer driver described in claim 10, wherein:

the first image data is printed using a first color; and the second image data is printed using a plurality of colors not including the first color.

13. The printer driver described in claim 10, wherein:

the print data generation unit generates the print data by combining the printed color of the first image data and the printed color of the second image data to produce a single color so that the printed first image data is visually indiscernible from the printed second image data when none of the colors used to print the first and second image data is lost; and generates the print data by combining the printed color of the first image data and the printed color of the second image data to produce different colors that are visually discernible when any one of the colors used to print the first and second image data is lost.

14. A system for printing a stamp with a printer, comprising:

a display device that displays an image data selection screen for selecting a stamp corresponding to a print mode;

an input device for selecting a stamp;

a computer that stores a print mode and a stamp correlated to the print mode;

a printer driver that is installed in the computer, selects a stamp for a specified print mode from the computer and generates print data, and controls the printer to print in the specified print mode; and a printer that receives the print data from the computer and prints the selected stamp.

* * * * *